United States Patent Office 2,800,963
Patented July 30, 1957

2,800,963

METHOD AND COMPOSITION FOR SEALING EARTH FORMATION

Hayden Roberts and Wayne F. Hower, Duncan, Okla., assignors to Halliburton Oil Well Cementing Company, Duncan, Okla.

No Drawing. Application December 10, 1953, Serial No. 397,484

5 Claims. (Cl. 166—22)

This invention relates to methods and compositions for sealing earth formations and more particularly to methods and compositions for sealing off water bearing formations adjacent to oil or gas bearing formations.

For many years it has been the practice to inject slurries of Portland cement into earth formations adjacent to oil or gas bearing formations. The method is known in the trade as "squeeze cementing" and involves the exertion of tremendous pressure on the slurry while confining it, insofar as possible, by the use of packers or the like, to the particular formation or formations which is to be sealed off.

The conventional water-cement slurries have been applied with a great deal of success as a means of shutting off water, but their wide usage has definitely pointed to the fact that, in many instances, improvement was needed to increase the efficiency of squeeze cementing. Tests in the laboratory and initial applications in the field have shown that oil-cement slurries, and their modifications, are a step in that direction.

Non-aqueous cement slurries, such as oil-cement slurries, have heretofore been used to selectively seal water bearing formations in oil wells. See Petroleum production Engineering-Development by Lester C. Uren, 3rd ed., (1946), pages 473 and 474. See also the United States patent to Smit No. 1,491,427, granted April 22, 1924.

The operation of sealing with non-aqueous slurries is such that the cement solidifies and seals upon hydration resulting from contact with the water existing in the earth formations. It is selective in its action because it does not set unless it comes in contact with water, so it will not set in or on the surface of rock which bears only oil.

Care must, of course, be taken to avoid accidentally mixing water with the non-aqueous slurry while pumping it down into the well. As suggested in the paper by Harvey T. Kennedy, "Chemical Methods for Shutting Off Water in Oil and Gas Wells," appearing in Petroleum Development and Technology, A. I. M. E., 1936, pages 177 to 186, it is necessary or at least highly desirable to circulate oil ahead of the non-aqueous slurry so as to remove any water bearing mud from the walls of the well bore before the slurry passes down the bore.

In accordance with the present invention a non-aqueous cement slurry having special ingredients and special properties is employed for selectively sealing water bearing formations in oil or gas wells.

The techniques and steps in the method of injecting the non-aqueous slurry into the formations do not differ greatly from those commonly used in "squeeze cementing" water-cement slurries, other than those suggested by Kennedy, as mentioned above, to avoid, insofar as possible, premature contamination with water, but there is one difference which is important.

Where water-cement slurries are employed, the mixing is done at the surface of the ground. To avoid premature setting, it must then be pumped into the formation where it is to set as soon as possible.

Where non-aqueous cement slurries are employed, which require hydration of the cement particles for setting, as in the compositions of the present invention, the mixing with water must take place in the well bore. To as great an extent as possible, the hydration should take place at or near the water bearing rock to be sealed. Insofar as possible, there should be no hydration at or near oil bearing rock.

An important feature of the present invention resides, first, in the selection of materials which will tend to cause hydration at the desired place in the well bore and tend to prevent it at the undesired places, and secondly, in the step of "hesitating" in the procedure at the right time to permit the mixing of the water furnished by the earth formations with the particles of cement.

Of course, many oil bearing rocks contain some water. Also, it frequently happens that water "cones-up" in an oil producing formation as the oil is being produced. Oil sands are also frequently contaminated with water during the drilling operations. The success of the present invention, under any given set of circumstances, will depend to a large degree on the nature of the formations and the conditioning of the well before the application of the present method. Particularly, as an advance measure, it may be necessary to drive as much water as possible from the oil bearing formations or at least isolate that water from the slurry forced into the oil bearing formations, so that they will not become permanently sealed when the adjacent water bearing formations are sealed.

In accordance with the present invention, a non-aqueous slurry is prepared by mixing, as the essential ingredients, Portland cement, oil, and a surface active agent which is miscible with hydrocarbons and either soluble or dispersible in hydrocarbons.

The oil selected for making the slurry should be as free from water as possible so as to keep the cement particles dry. Some diesel fuels contain as much as 15% water. These should be avoided, although one successful operation of the present invention has been performed using diesel fuel with such a high percentage of water in it. Usually kerosene and diesel fuels contain less than 1% of water and such oils are recommended for use in the composition of the slurry. Crude oil can be used, but may cause trouble unless care is exercised to see that it does not interfere with the action of the surface active agent. If crude oil is used it should have an API gravity of 30 degrees or more, be untreated, and, of course, be as free from water as possible.

The selection of the surface active agent depends on the following end effects:

1. It must cause the oil to accept more cement as a dispersion.
2. It must keep the dispersed cement particles suspended in the oil for several hours.
3. It must permit water to penetrate the slurry under little or no outside pressure.

The miscible surface active agent should be hydrocarbon soluble or hydrocarbon dispersible. The percentage of surface active agent based on the oil should be within the limits of 0.1% to 5% with the general use between 0.5% to 2.5%.

As to the type of surface active agent, it is thought that anionic compounds are not satisfactory by themselves. Best results have been with cationic and nonionic surface active agents and seem to fall in the following classes:

*Cationic.*—Compounds containing nitrogen such as substituted oxazolines, substituted glyoxalidines, tertiary amines, polyethoxy amines and quaternary ammonium compounds.

*Nonionic.*—Polyoxyethylene esters, polyoxyethylene thioethers, polyoxyethylene addition compounds, and alkyl phenoxy polyoxyethylene derivatives.

The addition of certain fatty acids and the like to the above can enhance the desirable properties of the surface active agent and should be included.

For example: A mixture of an alkyl phenoxy polyoxyethylene derivative and a mixture of fatty acids that contains oleic acid gives satisfactory results.

By using a surface active agent with the oil to make a cement slurry, it has been found that a slurry of great density can be made, but one which has good pumping characteristics and requires low squeeze pressure in injecting it into earth formations. It has also been found that the cement when finally set is hard and of low permeability.

A rather surprising feature of the composition is the relatively small amount of oil used. This is desirable because the less oil, the less liquid phase of slurry squeezed into the formation and the quicker the hydration of the cement.

Experimental mixes in the laboratory have led to the following recommended proportions:

| | | |
|---|---|---|
| Diesel oil | cc. | 140 |
| Surface active agent | cc. | 2.0 |
| Portland cement | grams | 400 |

The ingredients must be intimately mixed. In the laboratory the surface active agent was dissolved in the diesel oil while the oil was being violently agitated in a Waring Blendor. After about 30 seconds the cement was added. The addition of the last part of the cement caused a little thickening of the slurry but it became more fluid after about 10 seconds of further agitation.

An intimately mixed slurry so formed has a viscosity of 15 to 20 poises, so that it is readily pumped. It is not thixotropic. It sets, when it comes in contact with water, into a very dense mass having a compressive strength in the range of 1,375 pounds per square inch.

In commercial operations in the field, the following proportions have been used and are recommended:

| | | |
|---|---|---|
| Diesel oil | gallons | 400 |
| Surface active agent | do | 6 |
| Portland cement | sacks | 100 |

The slurry may be made up using an ordinary jet mixer such as is employed in making water-cement slurries, and, if properly mixed, it behaves, while being pumped, much the same as water-cement slurries except that it has no gel-like characteristics. Certain precautions should be taken, however, the most important of which is to insure against contamination with water, either that which may be present in the oil itself, or along the bore hole, or in the formations which are not intended to be sealed.

Another important precaution should be taken. This is with regard to other ingredients added to the slurry. In some cases, it is the practice to add sand, bentonite, ground volcanic ash containing some pumice, and other ingredients to water-cement slurries used in squeeze cementing oil wells. The above cited textbook by Uren suggests the use of bentonite, among other things for use with non-aqueous cement slurries. Sand is inert and, if dry, can do no harm. However, it has been found that bentonite absorbs the surface active agent where used with the composition of the present invention and tends to destroy its dispersing action.

The use of ground volcanic ash containing some pumice is not particularly harmful, but where used, it seems that an oil to cement ratio higher than that given above has to be employed to obtain a slurry having the desired characteristics.

As to the manner in which the slurry made up in accordance with the present invention is handled, the slurry is first circulated into position in the well bore in the usual manner. Techniques follow past methods very closely in many respects, but a few variations should be noted. Generally speaking, lower squeeze pressures are required with the cement slurries of the present invention and, in some cases, a smaller volume of cement is displaced. It is thought that a firm placement of the slurry in the desired place is all that is necessary to obtain the desired results. Where squeeze pressures have been difficult to obtain in the past, a slight variation of staging has been employed which has proved to be very successful.

The cement slurry of the present invention is placed opposite the formation and held in a static condition for a short period of time. This "hesitation" step is important in that it gives the surface active agent time in which to act to perform its special functions of permitting the cement particles to become water-wet near the water bearing formations along the well bore, while preventing the particles from becoming water-wet near the oil bearing formations.

A "hesitation" of 5 minutes is recommended before any squeeze pressure is applied. The squeeze is then applied with satisfactory pressures and a good job usually obtained. It is thought that the short waiting time permits the slurry to contact water which then forms a slurry of high viscosity at the interface. A better control of the material is then possible when the squeeze is continued.

The squeeze pressure may be applied by exerting high pump pressure on a follow-up liquid, which should be oil, preferably. The usual plugs may be used to separate the follow-up liquid from the slurry. The squeeze pressure causes the slurry to be injected into the hydrocarbon bearing formation as well as into the water bearing formation. In fact more slurry may flow into the hydrocarbon bearing formation than into the water bearing formation. However, unless and until any portion of the slurry comes in contact with water, it will not set up, so that if conditions are right and if the amount of slurry is regulated correctly, the sealing action will be selective. The portion injected into the hydrocarbon bearing rock will not set at all while that injected into the water bearing rock will set into a hard dense mass.

Water starts to penetrate the slurry as soon as contact is made and continues until the cement has set. Therefore, waiting-on-cement time should be governed by the well-known setting properties of Portland cement and has varied between 24 and 72 hours, depending upon the specific conditions of each well. The addition of the surface active agent to the slurry causes a more even and thorough penetration of the water and reduces the possibility of oil pockets forming in the set cement.

Certain oil well conditions prevent the slurry of the present invention from being an absolute method of selectively shutting off water. Wells that are producing great quantities of water or those making smaller quantities and allowed to remain static for a period of time, will have water across the oil producing part of the formation. Pumping into the well will force additional water into the oil pay thus supplying the water needed to penetrate the squeezed slurry and cause its set.

In using the present invention, field applications have shown that a hard cement cap is often formed on top, then unset slurry across the oil zone, and again hard cement across the water zone below the oil zone. The cap on top is believed to be due to contamination with water in the follow-up liquid used to apply the squeeze pressure to the slurry.

It has been found that reperforation is necessary in a majority of the cases to reestablish communication with the oil formation. The thickness of the set cement against the oil zone has varied and will depend upon individual well conditions, but good results generally have been obtained, even in open hole completions.

The results have indicated that the cement slurry of the present invention can be applied wherever squeeze cementing has been used in the past to shut off water.

Particularly encouraging results have been obtained in Kansas where Dakota water has eaten holes in the casing above the pay. Water base slurries frequently were not satisfactory because squeeze pressures were difficult to obtain and cement was often washed away by the water before it could set. Several jobs with the slurry of the present invention have shown a complete shutoff with only one application.

A well in Oklahoma was fractured in 12 feet of open hole with the resulting production being 500 barrels of water and only a show of oil. The formation was squeezed with 100 sacks of the slurry of the present invention with a maximum pressure of 2,000 p. s. i. applied. After cleaning out, it was open hole perforated with production leveling out at 20 barrels of oil per day and no water.

Another well in Oklahoma was producing 60 barrels of oil and 40 barrels of water per day through perforations. The entire formation was squeezed with the slurry of the present invention, cleaned out, and treated with 250 gallons of a mud-cleanout agent. Resulting production was 70 barrels of pipe-line oil per day.

A well in the Gulf Coast area had been squeezed twice with water-cement slurries, but it continued to make 100 percent water. A squeeze with the slurry of the present invention was performed with very good pressures being obtained with a relatively small volume of slurry. The well was then recompleted to produce, at last report, 179 barrels of oil per day and no water.

Many brands of Portland cement have been successfully mixed with oil using a surface active agent. Very little difference could be detected in the various slurries as far as viscosity was concerned, but variations in their fluid loss properties were noted. Some brands of cement produced slurries that showed a very low fluid loss while others had relatively high losses. In all cases, fluid losses were less than those obtained with oil-cement slurries without the surface-active agent or with conventional water-cement slurries.

The improved pumping characteristics, developed by the use of the surface active agent, makes a readily handled slurry that can be placed with ease and, in like manner, the excess reversed from the tubing after the necessary squeeze pressure has been obtained.

The proportions of the ingredients of the present invention are not believed to be critical and the invention should not be regarded as limited to the proportions given above, these being recited merely to make the disclosure complete and to illustrate how the invention may best be carried out. Various other changes may be made without departing from the spirit of the invention or the scope of the annexed claims.

We claim:

1. A composition of matter adapted for use in sealing water bearing earth formations in oil wells or the like consisting of an intimately mixed pumpable slurry of a viscosity of from 15 to 20 poises, the essential ingredients of which are Portland cement, an oil containing very little water, in the proportion of about 400 gallons per 100 sacks of cement, and a surface active agent which is miscible with hydrocarbon in the proportion of about 6 gallons per 100 sacks of cement, the slurry being such that the Portland cement therein will not set unless and until the slurry comes in contact with water, whereupon it sets into a hard dense mass.

2. The method of selectively sealing water bearing earth formations adjacent hydrocarbon bearing formations in oil wells or the like, consisting in intimately mixing Portland cement, in a proportion of about 400 gallons of oil to 100 sacks of cement, an oil containing very little water, and a surface active agent which is miscible with hydrocarbons in a proportion of about 6 gallons of agent to 100 sacks of cement, to make a non-aqueous pumpable slurry of a viscosity of 15 to 20 poises, circulating the slurry so formed into a bore hole in the earth formations until it is adjacent both a hydrocarbon bearing formation and adjacent water bearing formation, stopping the circulation and hesitating a short period of time to allow water from the water bearing formation to come in contact with the portion of the slurry adjacent the water bearing formation, then exerting high pressure on the slurry to squeeze the same into both the hydrocarbon bearing formation and the water bearing formation and holding the slurry in that position until the slurry in the water bearing formation sets into a hard dense mass.

3. A composition of matter adapted for use in sealing water bearing earth formations in oil wells or the like consisting of an intimately mixed pumpable slurry of a viscosity of 15 to 20 poises the essential ingredients of which are Portland cement, an oil containing very little water, and a cationic surface active agent which is hydrocarbon soluble and will permit water to penetrate the slurry without the application of external pressure, the proportions of the slurry being about 400 gallons of oil and 6 gallons of agent to 100 sacks of cement whereby the slurry is such that the Portland cement therein will not set unless and until the slurry comes in contact with water, whereupon it sets into a hard dense mass.

4. A composition of matter adapted for use in sealing water bearing earth formations in oil wells or the like consisting of an intimately mixed pumpable slurry of a viscosity of 15 to 20 poises the essential ingredients of which are Portland cement, an oil containing very little water, and a nonionic surface active agent which is hydrocarbon dispersible and will permit water to penetrate the slurry without the application of external pressure, the proportions of the slurry being about 400 gallons of oil and 6 gallons of agent to 100 sacks of cement, whereby the slurry is such that the Portland cement therein will not set unless and until the slurry comes in contact with water, whereupon it sets into a hard dense mass.

5. The method of selectively sealing water bearing earth formations adjacent hydrocarbon bearing formations in oil wells or the like, consisting in intimately mixing Portland cement, an oil and a surface active agent which is miscible with and soluble in the oil to make a non-aqueous pumpable slurry of a viscosity of 15 to 20 poises which will not set unless and until it comes in contact with water but which sets into a hard dense mass when it comes in contact with water, the proportions being about 400 gallons of oil and 6 gallons of agent to 100 sacks of cement, circulating the slurry so formed into a bore hole in the earth formations until it is adjacent both a hydrocarbon bearing formation and an adjacent water bearing formation and then exerting high pressure on the slurry.

References Cited in the file of this patent

UNITED STATES PATENTS

| | | |
|---|---|---|
| 1,107,979 | Mitchell | Aug. 18, 1914 |
| 1,491,427 | Smit | Apr. 22, 1924 |
| 1,772,999 | Huber | Aug. 12, 1930 |
| 2,065,512 | Cannon | Dec. 29, 1936 |
| 2,146,480 | Kennedy | Feb. 7, 1939 |
| 2,654,674 | Frankenhoff | Oct. 6, 1953 |